United States Patent
Marino et al.

(10) Patent No.: US 9,745,841 B2
(45) Date of Patent: Aug. 29, 2017

(54) FRACTURE CLEAN-UP BY ELECTRO-OSMOSIS

(75) Inventors: Sonia Marino, Salt Lake City, UT (US); Marc Thiercelin, Ville d'Avray (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 1126 days.

(21) Appl. No.: 13/125,099

(22) PCT Filed: Oct. 24, 2008

(86) PCT No.: PCT/RU2008/000662
§ 371 (c)(1),
(2), (4) Date: Aug. 3, 2011

(87) PCT Pub. No.: WO2010/047612
PCT Pub. Date: Apr. 29, 2010

(65) Prior Publication Data
US 2011/0278012 A1    Nov. 17, 2011

(51) Int. Cl.
*E21B 43/267* (2006.01)
*C09K 8/52* (2006.01)
*C09K 8/68* (2006.01)
*C09K 8/80* (2006.01)
*E21B 43/26* (2006.01)

(52) U.S. Cl.
CPC .............. *E21B 43/267* (2013.01); *C09K 8/52* (2013.01); *C09K 8/68* (2013.01); *C09K 8/80* (2013.01); *C09K 8/805* (2013.01); *E21B 43/26* (2013.01); *C09K 2208/08* (2013.01); *C09K 2208/26* (2013.01)

(58) Field of Classification Search
CPC .................................. C09K 8/80; C09K 8/805
See application file for complete search history.

(56) References Cited

U.S. PATENT DOCUMENTS

| | | | |
|---|---|---|---|
| 5,187,011 A | | 2/1993 | Manalastas et al. |
| 5,551,516 A | * | 9/1996 | Norman et al. ........... 166/308.2 |
| 6,069,118 A | | 5/2000 | Hinkel et al. |
| 6,192,985 B1 | * | 2/2001 | Hinkel et al. .............. 166/280.1 |

(Continued)

FOREIGN PATENT DOCUMENTS

| | | |
|---|---|---|
| RU | 2256786 C2 | 11/2004 |
| RU | 2007104596 A | 8/2008 |

(Continued)

OTHER PUBLICATIONS

Electroosmotic Phenomena in Porous Media, Coelho et al., Journal of Colloid and Interface Science, 181, 169-190, 1996.

(Continued)

*Primary Examiner* — Caroline Butcher
(74) *Attorney, Agent, or Firm* — Jody Lynn DeStefanis; Robin Nava

(57) ABSTRACT

A method of fracture fluid clean-up from a fracture by assisting Darcy flow with electro-osmotic effects is provided. Proppants having suitable surface potential, and fracture fluids having suitable electrical conductivity are employed. A suitable electric field is imposed, using electrodes placed on the surface or in adjacent wells. The current creates an electro-osmotic flow that carries fluid to the wellbore.

27 Claims, 3 Drawing Sheets

(56) References Cited

U.S. PATENT DOCUMENTS

| | | | |
|---|---|---|---|
| 6,283,212 | B1 | 9/2001 | Hinkel et al. |
| 6,725,930 | B2 | 4/2004 | Boney et al. |
| 7,073,581 | B2 * | 7/2006 | Nguyen et al. .......... 166/250.12 |
| 7,275,596 | B2 | 10/2007 | Willberg et al. |
| 7,350,572 | B2 | 4/2008 | Fredd et al. |
| 7,380,600 | B2 | 6/2008 | Willberg et al. |
| 7,380,601 | B2 | 6/2008 | Willberg et al. |
| 7,398,826 | B2 | 7/2008 | Hoefer et al. |
| 7,398,926 | B1 | 7/2008 | Kikin et al. |
| 2002/0193257 | A1 * | 12/2002 | Lee et al. ...................... 507/200 |
| 2005/0274510 | A1 | 12/2005 | Nguyen et al. |
| 2006/0102345 | A1 | 5/2006 | McCarthy et al. |
| 2008/0271885 | A1 * | 11/2008 | Kaminsky ..................... 166/245 |

FOREIGN PATENT DOCUMENTS

| | | |
|---|---|---|
| SU | 918918 | 4/1982 |
| SU | 1686136 A1 | 10/1991 |

OTHER PUBLICATIONS

Electroosmotic Phenomena in Fractures, Marino et al, Journal of Colloid and Interface Science, 223, 292-304, 2000.

Electroosmosis in porous solids for high zeta potentials, Gupta et al., Journal of Colloid and Interface Science, 303, 593-603.

Voneiff et al., "The Effects of Unbroken Fracture Fluid on Gaswell Performance," SPE paper 26664.

Pope et al., "Field Study of Guar Removal from Hydraulic Fractures," SPE paper 31094.

Willberg et al., "Optimization of Fracture Cleanup Using Flowback Analysis," SPE paper 39920.

Brannon and Pulsinelli, "Evaluation of the Breaker Concentrations Required to Improve the Permeability of Proppant Packs Damaged by Hydraulic Fracturing Fluids," SPE paper 19402.

Small et al., "Improving Fracture Conductivities with a Delayed Breaker System: A Case History," SPE paper 21497.

Elbel et al., "Increased Breaker Concentration in Fracturing Fluids Results in Improved Gas Well Performance," SPE paper 21716.

Bernard, "Plausibility of long distance electrotelluric precursors to earthquakes," Journal of Geophysical Research, 97, No. B12, 17531-17546, 1992.

Zlotnicki & Le Mouel, "Possible electrokinetic origin of large magnetic variations at la Fournaise volcano," Nature, 343, 633-636, 1990.

Probstein & Hicks, "Removal of Contaminants from Soils by Electric Fields," Science 23, vol. 260, No. 5107, pp. 498-503, Apr. 23, 1993.

Rosanne et al., "Electro-osmotic coupling in compact clays," Geophysical Research Letters., 31, L18614, 2004.

Homsy, "Viscous Fingering in Porous Media," Annual Reviews of Fluid Mechanics, vol. 19, pp. 271-311, 1987.

Overbeek, "Interparticle forces in colloid science," Powder Technology, vol. 37, pp. 195-208, 1984.

Coelho et al., "Electroosmotic Phenomena in Porous Media," J. Colloid and Interface Science, vol. 181, pp. 169-190, 1996.

Marino et al., "Electroosmotic Phenomena in Fractures," J. Colloid Interface Sci., vol. 223, pp. 292-304, 2000.

Overbeek, Colloid Science, edited by H.R. Krugt, Elsevier Sci., New York, 1952.

Gupta et al., "Electroosmosis in porous solids for high zeta potentials," Journal of Colloid and Interface Science, vol. 303, 593-603, 2006.

* cited by examiner

FRACTURE CLEAN-UP BY ELECTRO-OSMOSIS

BACKGROUND OF THE INVENTION

Some embodiments relate to the recovery of hydrocarbons from subterranean formations. In some cases, they relate to methods of using electro-osmotic coupling effects to improve fracture clean-up to increase the rate and/or amount of hydrocarbon that flows to producing wells.

Hydrocarbons (gas, condensate, and oil) are typically found in the pores of subterranean rock formations. Although occasionally hydrocarbons flow naturally to a producing well at a commercially acceptable rate and extent due to inherent hydraulic forces, normally some means must be employed to increase the rate and/or extent of this flow. Methods include pumping and enhanced recovery, which will not be discussed further, and stimulation. Stimulation methods increase or improve the flow path from the reservoir to the producing well. They include acidizing, fracturing, fracturing and gravel packing in a single step (fracpacking) and acid fracturing. In most cases, stimulation involves injecting into a formation a fluid that, if left in place, would hinder the subsequent flow of fluids (injection fluids or fluids to be produced). Therefore, fluids used in stimulation treatments are typically produced back, that is removed back through the well through which they were injected. However, for a variety of reasons, in hydraulic fracturing this clean-up is usually difficult and incomplete. A method of improving hydraulic fracturing fluid clean-up is needed.

SUMMARY

One embodiment is a method for promoting clean-up of fracture fluid from a fracture in a subterranean formation penetrated by a wellbore after a fracturing treatment. The method involves creating an electrically conductive proppant pack, fracturing with an electrically conductive fracture fluid, placing at least one electrode in electric communication with the fracture, and subjecting the fracture to an electric field. The proppant is optionally sand (which is inherently electrically conductive) or a material that is not normally electrically conductive, such as a ceramic, coated with a coating that makes the proppant electrically conductive. The coating may, for example, include a metal, for example metal particles. The coating may include an electrically conductive resin. The surface potential of the proppant is preferably at least as negative as about −50 mV.

In other embodiments, the proppant pack may also include electrically conductive fibers, for example metallic fibers. The fibers optionally dissolve during clean-up. The proppant pack may also include metallic particles. The proppant pack may also include proppant particles that are not electrically conductive. The proppant pack may include conductive and non-conductive particles of differing densities. The conductivity of the proppant pack may be varied along the length of the fracture. The fracture fluid may include a breaker. The pH of the fluid is preferably between about 7 and about 11.

In yet further embodiments, injection of the fracture fluid is preceded by injection of a pad fluid having a higher electrical conductivity than the fracture fluid. Optionally, the fracture fluid has a lower electrical conductivity than the formation fluid. The conductivity of the fracture fluid may be varied along the length of the fracture. Usually a hydraulic pressure gradient is created.

In various embodiments, the fracture has two wings and at least one electrode is placed in electric communication with each wing. Optionally, at least one electrode is the casing of another wellbore. The electric field may be initiated at the start of clean-up or after the start of clean-up. The electric field may be applied intermittently. Preferably, the electric field in the fracture is between about 0.05 V/m and about 10 V/m.

DETAILED DESCRIPTION

Some embodiments will be described in terms of treatment of vertical wells, but is equally applicable to wells of any orientation. Embodiments will be described for hydrocarbon production wells, but it is to be understood that such may be used for wells for production of other fluids, such as water or carbon dioxide, or, for example, for injection or storage wells, which typically must be produced back to clean them up before they can be used for their intended purposes. It should also be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventors have possession of the entire range and all points within the range.

Figure 1:
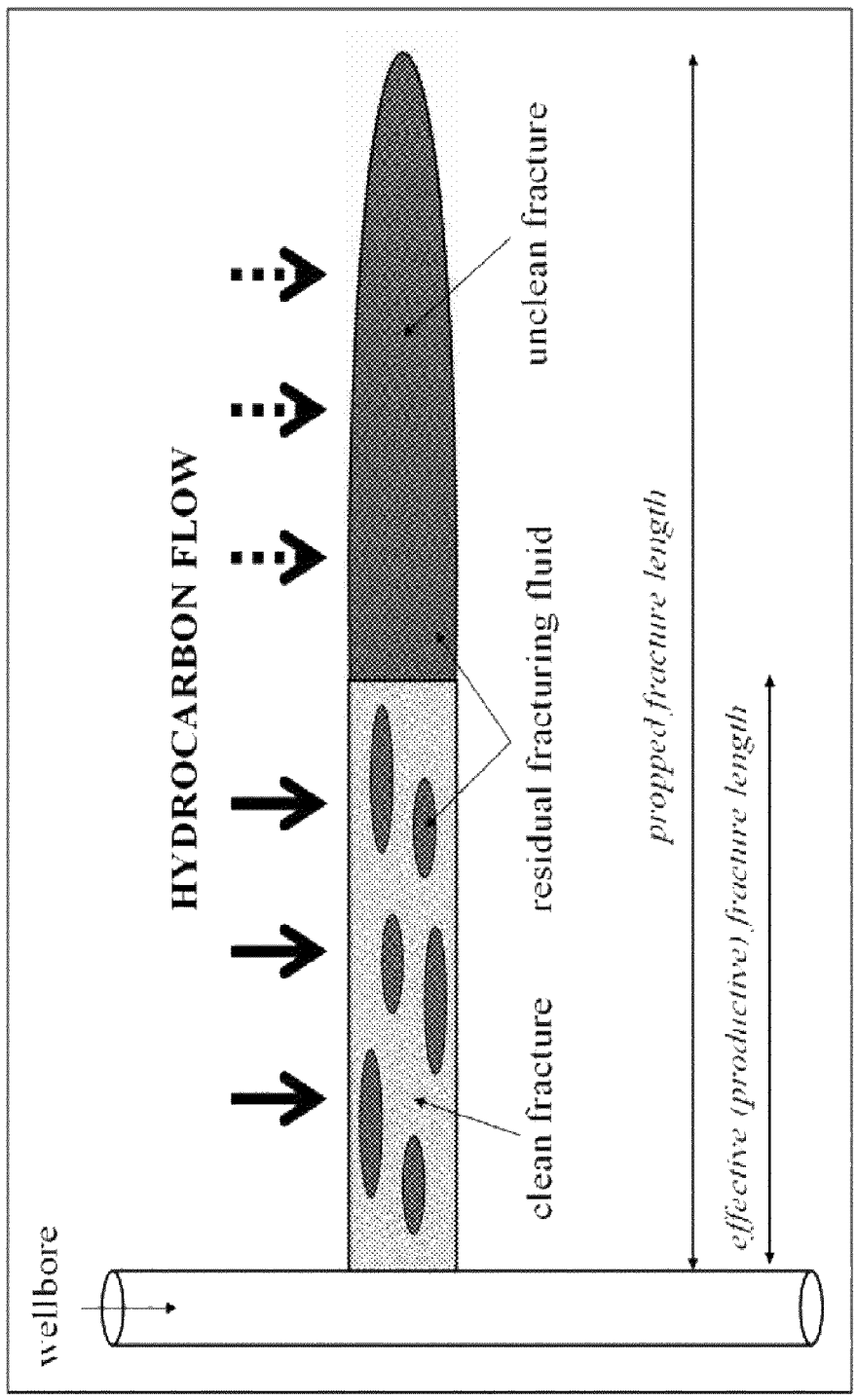
FIG. 1 shows a partially clean hydraulic fracture without application of the method of the Invention.

During a hydraulic fracturing treatment, a highly viscous fracturing fluid is pumped under pressure into a reservoir (for example a hydrocarbon reservoir containing petroleum and natural gas) to propagate the fracture and to transport and place solid particles called proppant, inside the fracture. The proppant may be a natural material, for example sand, or may be a synthetic material, for example a ceramic. When the pumping is stopped and the pressure is released, the fracture closes on the proppant, which holds the fracture open. Once the treatment is finished, the viscous fracturing fluid must be removed from the proppant pack in order to leave a highly conductive path for the production of formation fluid. The residual fracturing fluid, and any damaging fluid that has leaked off into the porous reservoir formation, is generally cleaned up by flowing fluid from the formation through the fracture to the surface via the wellbore. A good fracture clean-up is essential, as it can greatly improve the well productivity. However, a complete clean-up and, consequently, optimal flow of hydrocarbons into and through the fracture are generally affected by a number of factors. These include the extent of degradation of fracturing fluid with temperature and time (in particular the extent of breaking of polymeric viscosifiers), yield stress effects, viscous fingering phenomena, capillary effects, the likely presence of a filter cake, formation damage, multiphase flow, and non-Darcy effects. An illustration of a partially clean hydraulic fracture is shown in FIG. 1. The fracture generally cleans up from the wellbore towards the tip, and commonly much of the far end of the fracture is not cleaned up. Furthermore, even portions of the cleaned up part of the fracture may contain residual fracture fluid. It is important to emphasize the difference between the actual total propped length of the fracture and the effective (productive) length, which is often believed to be half the actual length. Improving fracture clean-up represents an immense challenge for the hydraulic fracturing community.

Fracturing fluids, especially if they are viscosified with a polymer, usually contain a chemical additive, called a breaker, which causes the reduction of the fluid viscosity by literally breaking the large polymeric molecules. Chemical breakers are typically oxidizing agents or enzymes. When the viscosity decreases, the fluid mobility increases, and the fracture clean-up is expected to improve. Hydraulic fracturing treatments are performed with specific breaker schedules. A typical schedule places the highest breaker concentration near the wellbore in order to facilitate the fluid flowback as soon as the well is put into production. Although the results are never fully satisfactory, the use of breakers is still considered the most efficient method of assisting fracturing fluid flowback.

Only a process engaging the entire fracture equally, along all the propped length, can result in a completely successful clean-up. We have developed a method which, combined with the positive action of breakers, mobilizes all of the fluid initially retained in the proppant pack. In particular, the method is able to remove the fluid from the tip of the fracture. The method is based on the physico-chemical mechanism of electro-osmosis.

We have found that fracture fluid flowback, and thus fracture clean-up, may be enhanced by assisting the Darcy flow of the fluid (driven by the pressure gradient between the wellbore and the formation and between the wellbore and the fracture tip) with a secondary electro-osmotic flow induced by an electrical gradient applied in the reservoir region where the fracture is located. The combination of two driving forces (i.e., the pressure difference and the electric field) results in an increase of the total flow through the proppant pack, and facilitates the fluid extraction. Moreover, the magnitude of the electro-osmotic flow may reach and even overtake the magnitude of the Darcy flow if the proppant pack is given electro-conductive properties. In a preferred embodiment, electro-conductive proppant particles are injected during the hydraulic fracturing treatment. In another embodiment a material that decreases the proppant pack permeability to an acceptable extent, optionally temporarily, is also added. In yet another embodiment, a material that increases the proppant pack surface area is added. A material that increases the proppant pack surface area and may decrease the proppant pack permeability is fibers, for example slowly soluble fibers. Despite any permeability reduction that may occur, addition of fibers or other high surface area materials, is highly advantageous because it increases the surface area on which the electro-osmotic effects occur. A very basic schematic of the two flows is illustrated in FIG. 2.

After the hydraulic fracturing treatment, the extraction of the residual fracturing fluid which was injected into the reservoir to propagate the fracture is made possible by the pressure difference created between the fracture (where the pressure is high) and the wellbore (where the pressure is lower). Therefore, the fluid flow through the proppant pack is driven by the pressure gradient ∇P, and is governed by Darcy's law, given by $$U_{Darcy} = -\frac{K}{\mu} \cdot \nabla P \qquad (1)$$

in which K and µ denote the permeability of the proppant pack and the fluid viscosity, respectively. Note that the fluid velocity $U_{Darcy}$ increases when the viscosity µ decreases. The incorporation of breakers into the fracturing fluid helps to achieve a better fracture clean-up by decreasing the fluid viscosity. Not only does this allow the fluid to flow more rapidly under a given pressure drop, but this also minimizes the viscous fingering of the formation fluid into the fracturing fluid which occurs when the formation fluid is less viscous than the fracturing fluid. In the method of the present Invention, it is preferred to use breakers as effectively as possible. However, as already discussed, Darcy flow alone cannot be expected to allow the total removal of the fluid.

Figure 2:
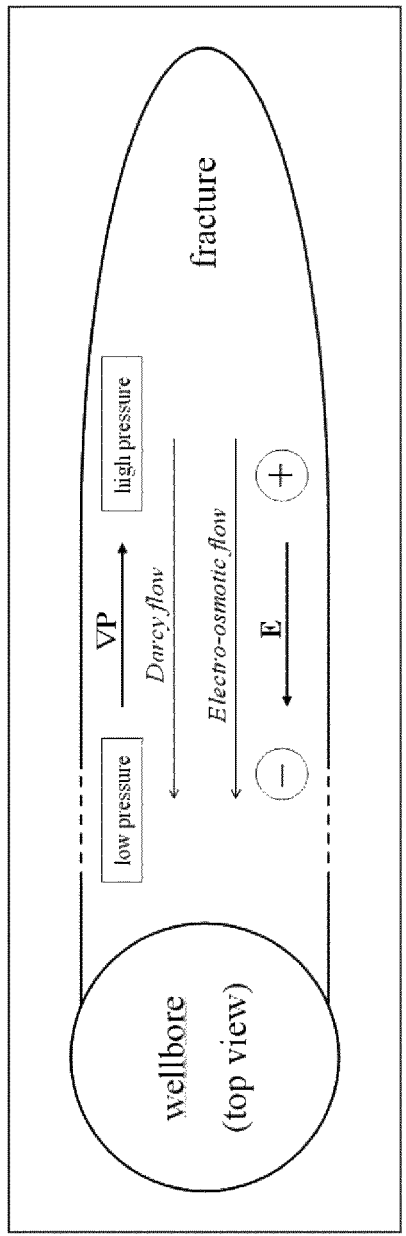
FIG. 2 is a schematic of the Darcy and electro-osmotic flows through a fracture according to the method of the Invention.

In the method, the Darcy flow is assisted with an additional flow based on electro-osmotic phenomena, as shown in FIG. 2. This increases the total flow in regions where the Darcy flow is already efficient, and also results in flow in regions where Darcy flow is almost absent, for example regions closer to the fracture tip. Furthermore, electro-osmotic flow is not subject to viscous fingering, especially when the formation fluid is not sensitive to electro-osmotic phenomena (for example when the produced fluid is oil and gas).

Figure 3:
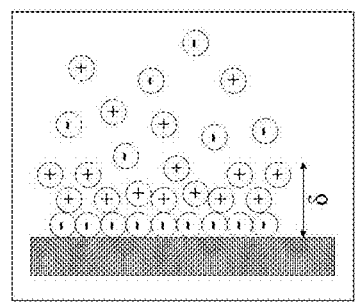
FIG. 3 depicts the ion distribution within an electrolyte near a negatively-charged solid surface.

The electro-osmotic phenomenon may be understood as follows. Consider an electrolyte flowing through a porous medium. (An electrolyte is defined as a chemical compound which dissociates into ions when placed in solution and therefore acquires the capacity to conduct electricity.) The mineral surfaces of the medium are assumed to be electrically charged. Far from the surfaces, the electrolyte may be considered to be neutral, that is the number of cations (positive ions) equals the number of anions (negative ions). However, near the surfaces, the ion distribution within the fluid is disturbed. For example, a negatively charged surface attracts positive ions from the solution and repels negative ones. Hence, in the region adjacent to the mineral surfaces, the electrolyte is charged, as shown in FIG. 3, where the mineral surface is shown on the left and ions in a fluid are shown on the right. The zone of disturbed ion distribution is classically called the Debye-Hückel layer or the electrical double-layer; it is shown by δ in FIG. 3. Its thickness is inversely proportional to the square root of the molar concentration of the ions in the fluid and usually varies from several Angströms to a few tens of nanometers.

Because of this electrical perturbation within the solution, if the porous medium is placed in an external electric field, E, the ions are set in motion, which creates an electric current, I, passing through the material. In addition, a non-zero volumetric body force acts on the electrolyte, in the Debye-Hückel layer, due to its net electric charge. Therefore, the fluid flows in the double-layer and, as a result of viscous friction, in the entire bulk, although the fluid experiences no body force in this region. An interstitial flow, characterized by the seepage velocity, U, is induced in the absence of any macroscopic pressure gradient. This phenomenon is called electro-osmosis. For the sake of completeness, let us describe the inverse process. In the presence of a macroscopic pressure gradient $\nabla P$, the fluid percolates through the material with the Darcy seepage velocity, U. The electrolyte motion within the double-layer affects the equilibrium ion distribution and entails an electric current density, I, generated in the absence of any external electric field. This is known as the electrokinetic effect.

Under the assumption that the forces E and $\nabla P$ remain sufficiently small, which restrains the system from deviating too far from equilibrium, the coupled transports I and U can be expressed by the following linear equations (Coelho et al., *J. Colloid Interface Sci.*, 181, 169-190, 1996):

$$I = \sigma \cdot E - \alpha \cdot \nabla P \quad (2a)$$

$$U = \beta \cdot E - \frac{K}{\mu} \cdot \nabla P \quad (2b)$$

where $\sigma$ is the electrical conductivity of the medium. The coupling tensors, $\alpha$ and $\beta$, refer to the electrokinetic and electro-osmotic effects, respectively. Note that if the electrokinetic coupling is ignored (i.e. $\alpha$=0), then Eq. (2a) simplifies to Ohm's law. Similarly, if the electro-osmotic coupling is neglected (i.e. $\beta$=0), then Eq. (2b) immediately becomes Darcy's law.

In Eq. (2b), the electro-osmotic flow itself is given by $$U_{EO} = \beta \cdot E \quad (3)$$

The coupling tensor $\beta$ depends primarily on the fluid properties, the electrical potential $\zeta$ at the mineral surfaces of the medium, and the geometrical parameters of the material, such as the porosity and the tortuosity. More details can be found in the studies of electro-osmotic phenomena through porous media by Coelho et al. (*J. Colloid Interface Sci.*, 181, 169-190, 1996) and through fractures by Marino et al. (*J. Colloid Interface Sci.*, 223, 292-304, 2000).

We should point out that the theoretical analysis presented above assumed the fluid to be Newtonian. However the method may apply to non Newtonian fluids, including those with yield stress. This can be notable because the presence of a yield stress in a non broken or poorly broken fracturing fluid is extremely detrimental to clean-up.

The generation of an electro-osmotic flow through a proppant pack (from the fracture tip to the wellbore in order to facilitate clean-up) requires that the fracturing treatment be designed so that the three following fundamental conditions be satisfied.

The Fracture Fluid can be an Electrolyte.

This may be easy to fulfill as most of the fluids commonly used for hydraulic fracturing treatments contain electrolyte components as clay stabilizers. In any case, a salt (for instance, NaCl or KCl) may be added to confer electrolyte properties to the fluid without any consequence on its efficiency, i.e. its effectiveness as a fracture fluid. As already mentioned, the Debye-Hückel length is inversely proportional to the electrolyte concentration. It may be preferable to choose a low salt concentration in order to optimize the thickness of the layer where the electro-osmotic coupling will be induced. Calculations suggest that an optimal salt concentration would be in the range of from about 0.0001 to 0.001 mol/L. For potassium chloride, typically used in fracturing fluids for clay control, this would be a concentration range of from about 0.0074 to about 0.074 g/L; potassium chloride is commonly used at about 2 weight % (about 20 g/L). Seawater, sometimes used in fracturing offshore wells, contains about 3.5 wt % salts. It is advantageous to reduce the salinity of fracture fluids by using alternative clay control agents, for example zirconium oxychloride (at typical concentrations of from about 0.02 to about 0.2 wt %), magnesium chloride (at typical concentrations of about 0.07 to about 0.18 wt %) or tetramethyl ammonium chloride (at a typical concentration of about 0.1 wt %). The use and concentrations of other additives that would decrease the Debye-Huckel length should be minimized. In some embodiments, the composition of the fracturing fluid is selected to optimize the electro-osmotic effects. If other considerations require that the fluid not be an optimal fluid for electro-osmotic effects, the consequences may be offset by increasing the magnitude of the electric field and increasing the surface electrical potential of the solids in the proppant pack.

The Surface of the Proppant Particles may be Electrically Charged.

Conventionally, proppant particles are typically made either of sand or ceramics. To produce an electro-osmotic effect, the surface of the proppant particles are electrically charged. The zeta potential of sand typically varies between about −10 and about −50 mV (measured with distilled water, at room temperature and atmospheric pressure) whereas ceramics have a zeta potential close to 0. As such, ceramics cannot generate any electro-osmotic flow and should be avoided. It is important to emphasize that high electrical surface potentials help to maximize electro-osmotic effects. A very promising option is to use proppant particles that have been coated with an electro-conductive resin, or that have been coated with a resin mixed with a conductive material; both methods are disclosed for example in US Patent Application Publication No. 2005/0274510, hereby incorporated by reference in its entirety. In particular, a special treatment of the particle surfaces will considerably increase the zeta potential; by non-limiting example, sand or ceramic proppant may be treated with a resin containing metallic particles or molecules. Another alternative is the use of metallic proppants, for example those disclosed in U.S. Pat. No. 6,725,930, hereby incorporated by reference in its entirety, or proppants coated with, for example, a metal or metallic powder, or with a metal-containing resin. Mixtures of electro-conductive and regular proppant particles may be used, although this would lower the effects. Yet another method of improving pack electrical conductivity is to incorporate conductive fibers, for example glass or metal fibers, or fibers coated with a metal or metallic powder. Electro-osmotic effects are initiated at the surface of the solid medium; fibers may offer a greatly increased surface area to enhance the electro-osmotic effect. Among many, there are two types of fibers which are particularly useful. The first is metal fibers because they are highly conductive. The second is slowly soluble fibers because after they dissolve (after the fluid clean up) the pack permeability is increased. A desirable combination is electrically conductive slowly soluble fibers, for example organic fibers at least partially coated with a material containing metallic particles. Suitable slowly-dissolving materials include polylactic acid, polyglycolic acid, polyvinyl alcohol, and other such materials, for example those described in U.S. Pat. Nos. 7,398, 826, 7,380,601, 7,380,600, 7,275,596, and 7,350,572, all of which are hereby incorporated by reference for their descriptions of materials that dissolve slowly under downhole conditions. As with fluid conductivity, the proppant should be conductive; one zeta potential is one that is more negative than about −50 mV. Finally, use of smaller-sized proppant gives increased contact between the proppant surface and the fluid. Another factor to be considered is that the electro-osmotic effect is greater when the pack permeability (or the pack porosity) is lower. The use of fibers and smaller sized proppant may both contribute to lower permeability. Other methods of temporarily lowering the proppant pack permeability may also be used, for example including additional slowly-dissolving solids besides proppant and fibers. Of course, all temporary changes to the proppant pack must increase the electro-osmotic effect without deleteriously affecting clean-up. In some embodiments, the properties of the proppant pack are selected to maximize the electro-osmotic effect.

The Region of the Fracture in a Macroscopic Electric Field.

Figure 4:
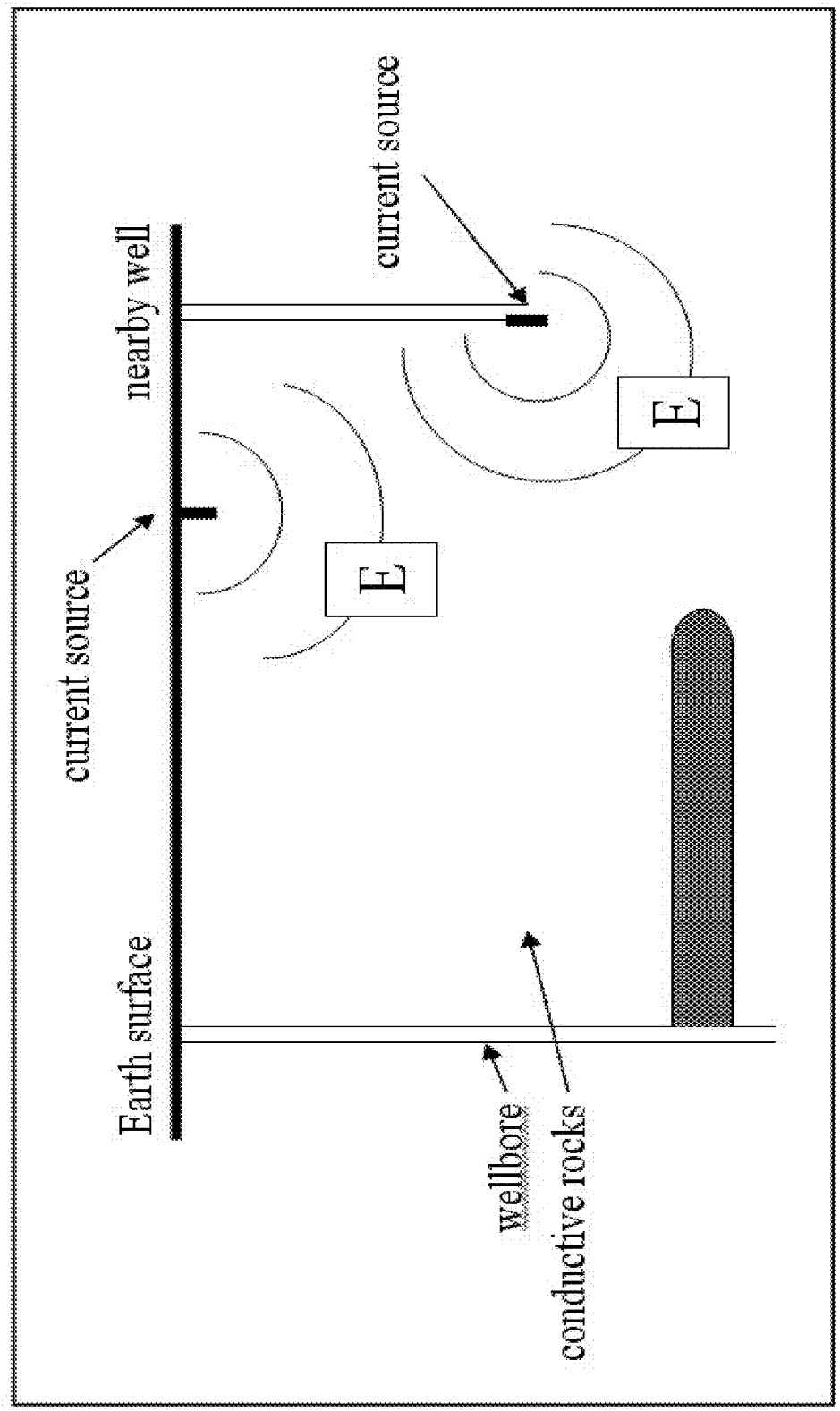
FIG. 4 shows representative methods of generating electro-osmotic effects through a fracture.

FIG. 4 shows several suitable methods of using some embodiments. Electrodes, used as current injection sources, may be installed at the Earth surface or in a nearby well. Note that the casing of a nearby well may be used as an electrode. The electric current is then easily transmitted to the fracture region by the conductive rocks and fluids of the adjacent geological rock layers; E designates the macroscopic electric field. Fractures typically extend roughly comparable distances in two wings on opposite sides of a wellbore; FIG. 4 shows only one half of a fracture. In practice, cleaning up a fracture would normally be done with two current injection sources, although one properly placed source may be used. The current is turned on when clean-up is begun, and turned off when suitable clean-up has been achieved, or at a point of diminishing returns. Initially, Darcy flow will probably predominate; it may not be practical to initiate the electro-osmotic assistance to the flow until Darcy flow becomes less satisfactory. Optionally, the current may be applied intermittently. Depending upon the job design, application of the current may last from a few minutes to a few days.

The methods have been described for fracturing fluids viscosified with polymers. In fact, the electro-osmotic effect may be employed with any fluid that contains an electrolyte, that is, with any fluid that contains free ions and that therefore behaves as an electrically conductive medium. This would include fluids viscosified with viscoelastic surfactants or with other non-polymeric viscosifiers, and would include fluids that are foamed or energized or that are water-external emulsions. Gelled oils and oil-external emulsions may also be used, provided that they contain free ions, because the optimal ion concentration is low. Many of the chemicals used in viscosifying fluids (polymers, viscoelastic surfactants, emulsifiers) are charged themselves, and many of them work better in the presence of salts. The magnitude of electro-osmotic effects increases with the pH of the solution. Experiments have shown that electro-osmotic effects are optimal at a pH between about 7 and about 11, so this is the optimal pH range for fracturing fluids used in some methods. This does not depend on the proppant.

The benefits of the electro-osmotic methods may be increased by using a pad fluid, in the hydraulic fracturing treatment, that has a higher electrical conductivity than the main carrier fluid. The pad fluid substantially or entirely leaks off into the formation during the treatment, and so is the first fluid to enter the fracture during flowback (clean up). Consequently, the electro-osmotic effect works more effectively on the carrier fluid than on the fluid entering the fracture from the formation, and the carrier fluid flows preferentially and cleans up exceptionally well. Similarly, the methods may work particularly well when the fluid to be cleaned up has a lower ionic strength than the formation fluid; again that results in preferential application of the electro-osmotic effect to the carrier fluid in the fracture.

The methods may be carried out in many ways that all fall within the wide scope of the Invention. These include, for example, (a) mixing proppants of different characteristics, for example a light proppant having electro-conductive properties and a non-charged heavy proppant (which would settle to the bottom first) in order to ensure preferential clean-up in the top part of the fracture, (b) mixing a heavy proppant having electro-conductive properties and a non-charged lighter proppant (which would rise to the top of the fracture) in order to ensure preferential clean-up in the bottom part of the fracture or (c) staging proppants of different properties, starting with a more electro-conductive proppant to ensure fracture tip clean-up first, then finishing with a less electro-conductive proppant.

Some illustrative embodiments may be further understood from the following example.

EXAMPLE 1

Consider a 100 m long underground fracture filled by a proppant pack having a permeability K=100 D, saturated by a fracturing fluid of viscosity μ=100 cP. A pressure difference of $10^7$ Pa is exerted between the fracture tip and the wellbore. The Darcy flow generated towards the wellbore may be estimated from Eq. (1). Ignoring viscous fingering effects in this example, the fluid velocity, equal to 8.6 m/day, is likely to lead to a timely and efficient clean-up of the fracture. However, extraction of the residual fracturing fluid becomes a serious problem for long fractures. For example, if the length of the fracture is increased to 500 m, then the Darcy flow has a velocity close to 1.7 m/day which, considering the desired length of clean-up, is very slow.

The Debye-Hückel length (a few nanometers) is expected to be very small with respect to the pore radius (a few microns). In this situation, the well-known Overbeek's expression can be applied. This formula, valid in the limit of very thin double-layers, relates the electro-osmotic coefficient, β, to the surface potential, ζ, (see Overbeek, *Colloid Science*, edited by H. R. Krugt, Elsevier Sci., New York, 1952) such that $$\frac{\beta}{\zeta} = \frac{\varepsilon}{\mu F} \quad (4)$$

where ε and F denote the permittivity and the formation factor, respectively. The permittivity, ε, is the product of the vacuum permittivity (equal to $8.85 \cdot 10^{-12}$ $C^2 N^{-1} m^{-2}$) times the relative permittivity (taken here to be equal to 80, for example, for pure water at 20° C.). The formation factor, F, is the ratio between the fluid electrical conductivity and the electrical conductivity of the medium (porous rock or proppant pack) filled by the same fluid. The formation factor of most of the rocks present at the Earth surface is usually higher than 1, since the conductivity of water is greater than the conductivity of the sedimentary rocks. In the case of a proppant pack containing some particles coated by an electro-conductive resin, the formation factor will be much lower than 1 because the conductivity of the metallic coat is clearly much larger than the conductivity of the fracturing fluid. The conductivity of drinking water ranges from 0.005 to 0.05 S/m while sea water has a conductivity of 5 S/m at 20° C. However, metals are excellent conductors with, for instance, conductivities equal to about $6 \cdot 10^7$ S/m for copper and $4 \cdot 10^7$ S/m for aluminum at 20° C. For the sake of completeness, note that these values are expected to decrease slightly when the temperature increases. We assume here that F is equal to 0.001.

Table 1 provides the velocity (in m/day) of the electro-osmotic flow calculated from Eq. (4) for various values of $\zeta$ and E. The fluid viscosity, $\mu$, is kept equal to 100 cP in order to make the comparisons with the Darcy flow velocities possible. Note that the equations given here are still valid for high zeta potentials, as the double-layer thickness is supposed to be very small (for more details, see Gupta et al. (*J. Colloid Interface Sci.*, 303, 593-603, 2006).

Table 1 shows the velocities (in m/day) of the electro-osmotic flow calculated for various values of the surface potential, $\zeta$, and the electric field, E, for $\mu$=100 cP and F=0.001; the percentages given in brackets are obtained with respect to the velocities of the Darcy flow for L=500 m, K=100 D, $\mu$=100 cP and $\Delta$P=$10^7$ Pa. For perspective, the zeta potential of sands typically ranges from about −15 to about −50 mV; some rocks can have zeta potentials of up to about −100 mV; materials having zeta potentials above about −500 mV are metallic. The orders of magnitude displayed in Table 1 show very clearly that for reasonable values of the surface potential, $\zeta$, and the electric field, E, the contribution of the electro-osmotic flow to the total flow through a proppant pack is not negligible. The electro-osmotic effect may have a significant impact on fracture clean-up, and thus on well productivity. For high (more negative) zeta potentials, the electro-osmotic flow may overtake the Darcy flow. Obviously, the inclusion of electro-conductive particles in the proppant is highly recommended in order to optimize the electro-osmotic effects. The value of 10 V/m is at present a practical upper limit, but the electro-osmotic effect, and therefore the method of the Invention, is operable in greater electric fields. An operator may estimate the electric field created in a fracture region, using a model involving the depth and the rock conductivity.

TABLE 1

|  | E = 0.1 V/m | E = 1 V/m | E = 10 V/m |
| --- | --- | --- | --- |
| $\zeta$ = −15 mV | 0.0009 (~0.05%) | 0.009 (~0.5%) | 0.09 (~5%) |
| $\zeta$ = −50 mV | 0.003 (~0.18%) | 0.03 (~1.8%) | 0.3 (~18%) |
| $\zeta$ = −100 mV | 0.006 (~0.35%) | 0.06 (~3.5%) | 0.6 (~35%) |
| $\zeta$ = −500 mV | 0.03 (~1.8%) | 0.3 (~18%) | 3 (~180%) |
| $\zeta$ = −1 V | 0.06 (~3.5%) | 0.6 (~35%) | 6 (~350%) |

We claim:

1. A method for promoting clean-up of a fracture fluid from a fracture in a subterranean formation penetrated by a wellbore after a fracturing treatment, the method comprising:
   (i) creating a fracture in a subterranean formation by pumping an electrically conductive fracture fluid into a wellbore under pressure;
   (ii) placing an electrically conductive proppant pack in the fracture in stages, wherein a first proppant placed during a first stage is more conductive than a second proppant placed during a later stage, wherein the first proppant is deposited at a fracture tip, and the second proppant is deposited behind the first proppant and closer to the wellbore;
   (iii) placing at least one electrode in electric communication with the fracture; and
   (iv) subjecting the fracture to an electric field whose strength is at least 0.05 V/m to induce electro-osmotic flow of the fracture fluid.

2. The method of claim 1 wherein the first proppant, the second proppant or both comprise sand.

3. The method of claim 1 wherein the first proppant is a ceramic coated with a coating that makes the proppant electrically conductive.

4. The method of claim 3 wherein the coating comprises a metal.

5. The method of claim 3 wherein the coating comprises an electrically conductive resin.

6. The method of claim 1 wherein the first proppant forming the electrically conductive proppant pack has a surface potential at least as negative as −50 mV.

7. The method of claim 1 wherein the electrically conductive proppant pack further comprises electrically conductive fibers.

8. The method of claim 7 wherein the fibers dissolve during clean-up.

9. The method of claim 1 wherein the electrically conductive proppant pack further comprises metallic particles.

10. The method of claim 1 wherein the electrically conductive proppant pack comprises proppant particles that are not electrically conductive.

11. The method of claim 10 wherein the electrically conductive proppant pack comprises conductive and non-conductive particles of differing densities.

12. The method of claim 11 wherein Darcy flow of the fracture fluid is assisted with the electro-osmotic flow.

13. The method of claim 1 wherein the fracture fluid comprises a breaker.

14. The method of claim 1 wherein the fracture fluid has a pH between about 7 and about 11.

15. The method of claim 1 wherein injection of the fracture fluid is preceded by injection of a pad fluid having a higher conductivity than the fracture fluid.

16. The method of claim 1 further wherein a hydraulic pressure gradient is created.

17. The method of claim 1 wherein the fracture has two wings and at least one electrode is placed in electric communication with each wing.

18. The method of claim 17 wherein at least one electrode is the casing of another wellbore.

19. The method of claim 1 wherein the electric field is initiated at the start of clean-up.

20. The method of claim 1 wherein the electric field is initiated after the start of clean-up.

21. The method of claim 1 wherein the electric field is applied intermittently.

22. The method of claim 1 wherein the electric field in the fracture is between about 0.05 V/m and about 10 V/m.

23. The method of claim 1 wherein the electrically conductive proppant pack further contains a component that decreases the permeability of the pack.

24. The method of claim 1 wherein the electrically conductive proppant pack further contains a component that increases the surface area of the pack.

25. The method of claim 1 wherein Darcy flow of the fracture fluid is assisted with the electro-osmotic flow.

26. A method, comprising:
(i) creating a fracture in a subterranean formation by pumping an electrically conductive fracture fluid into a wellbore under pressure;
(ii) placing an electrically conductive proppant pack in the fracture in stages, wherein a first proppant placed during a first stage is more conductive than a second proppant placed during a later stage, wherein the first proppant is deposited at a fracture tip, and the second proppant is deposited behind the first proppant and closer to the wellbore;
(iii) placing at least one electrode in electric communication with the fracture; and
(iv) generating an electric field in the fracture whose strength is at least 0.05 V/m to induce electro-osmotic flow of the fracture fluid,
wherein the first proppant is a material coated with a coating that makes the proppant electrically conductive.

27. A method, comprising:
(i) creating a fracture in a subterranean formation by pumping an electrically conductive fracture fluid into a wellbore under pressure;
(ii) placing an electrically conductive proppant pack in the fracture in stages, wherein a first proppant placed during a first stage is more conductive than a second proppant placed during a later stage, wherein the first proppant is deposited at a fracture tip, and the second proppant is deposited behind the first proppant and closer to the wellbore; and
(iii) placing at least one electrode in electric communication with the fracture, and generating an electric field in the fracture whose strength is at least 0.05 V/m to induce electro-osmotic flow of the fracture fluid,
wherein the second proppant stage comprises proppant particles that are not electrically conductive.

* * * * *